US011868027B2

(12) United States Patent
Boerup et al.

(10) Patent No.: US 11,868,027 B2
(45) Date of Patent: Jan. 9, 2024

(54) SOFTBOX LIGHT-ALTERING ELEMENT

(71) Applicant: MGMD BrainPower LLC, Tucson, AZ (US)

(72) Inventors: Spencer Boerup, Tucson, AZ (US); Robert Ziolkowski, Tucson, AZ (US)

(73) Assignee: MGMD BrainPower LLC, Tucson, AZ (US)

( * ) Notice: Subject to any disclaimer, the term of this patent is extended or adjusted under 35 U.S.C. 154(b) by 0 days.

(21) Appl. No.: 18/099,255

(22) Filed: Jan. 19, 2023

(65) Prior Publication Data

US 2023/0152671 A1    May 18, 2023

Related U.S. Application Data

(63) Continuation of application No. 17/841,459, filed on Jun. 15, 2022, now Pat. No. 11,586,096.

(60) Provisional application No. 63/211,272, filed on Jun. 16, 2021.

(51) Int. Cl.
*G03B 15/06* (2021.01)
(52) U.S. Cl.
CPC .................................. *G03B 15/06* (2013.01)
(58) Field of Classification Search
CPC ....................................................... G03B 15/06
See application file for complete search history.

(56) References Cited

U.S. PATENT DOCUMENTS

| | | | | |
|---|---|---|---|---|
| 6,491,405 B1* | 12/2002 | Shirilla | .................. | G03B 15/06 362/17 |
| 7,399,097 B1* | 7/2008 | DeLaPaz | ............... | G03B 15/02 362/17 |
| 11,586,096 B2* | 2/2023 | Boerup | .................. | G03B 15/06 |
| 2005/0088836 A1* | 4/2005 | Lowe | ..................... | G03B 15/06 362/18 |
| 2005/0225989 A1* | 10/2005 | Harlocker | .............. | G03B 15/06 362/341 |
| 2017/0248834 A1* | 8/2017 | Ortiz-Gavin | ........... | G03B 15/06 |
| 2019/0377242 A1* | 12/2019 | Boerup | .................. | G03B 15/06 |

FOREIGN PATENT DOCUMENTS

GB            2408316 A   *   5/2005   ............. G03B 15/06

* cited by examiner

*Primary Examiner* — Evan P Dzierzynski (57) ABSTRACT

A softbox having a body with an integrated light-altering element. The light-altering element may have a body and an edge, where at least a portion of the edge of the light altering element is non-removably coupled to at least a portion of softbox body proximate to the softbox edge. The other portions of the edge may have attachment elements that couple to other portions of the distal edge of the softbox. Another light-altering element, such as a grid, may couple to the softbox by coupling to a cuff of the body of the softbox.

12 Claims, 12 Drawing Sheets

SOFTBOX LIGHT-ALTERING ELEMENT

CLAIM OF PRIORITY

This application is a continuation of U.S. Non-Provisional application Ser. No. 17/841,459, filed Jun. 15, 2022, which claims the benefit of and priority to U.S. application Ser. No. 63/211,272, filed Jun. 16, 2021, now issued as U.S. Pat. No. 11,586,096, the disclosures of which are hereby incorporated by reference herein in their entirety.

INTRODUCTION

Softboxes are often used in photography and video/filmmaking to direct and alter light. For example, softboxes are used to direct light onto a subject of a photographic shoot or onto a set of a film. These light-altering elements alter the light from a source to the subject. Such light-altering elements include grids, diffusers, and gels.

These light-altering elements are typically standalone devices that attach to the softbox using hook-and-loop fasteners, button fasteners, or snaps. In some cases, the light-altering elements are a flexible fabric and are elastically stretched over the light-directing end of a frame of a softbox.

Problems with this existing technology include users having difficulty quickly and securely coupling the light-altering element to the light directing end of the softbox. Stand-alone hook and loop fastening connections require a user to align the hook portion with the loop portion, which can be difficult. Failure to do so could lead to an insecure connection. In addition, stretching an elastic fabric over a light directing end can be troublesome, especially when the geometry of the softbox requires special attention to the alignment of the elastic fabric to ensure a tight and accurate fit. When a user improperly attaches or misaligns the light-altering element to a softbox, the photo/video/film can be negatively impacted. Thus, it remains desirous to develop technology that can allow a light-altering element to be quickly and accurately coupled to a softbox.

It is with respect to these and other considerations that the technologies described below have been developed. Also, although relatively specific problems have been discussed, it should be understood that the embodiments should not be limited to solving the specific problems identified in the introduction.

Improved Softbox Light-Altering Element

This Summary is provided to introduce a selection of concepts in a simplified form, which concepts are further described below in the Detailed Description. This Summary is not intended to identify key factors or essential features of the claimed subject matter, nor is it intended to be used to limit the scope of the claimed subject matter.

The technology relates to systems and methods for coupling light-altering elements to a softbox. In one aspect of the technology, a light-altering element, such as a diffuser or gel, includes an attachment element around at least a portion of the outer edge of the light-altering element. In an example, the attachment element is a zipper. The zipper, in examples, aligns with a corresponding zipper on the edge of a distal portion of the softbox body (e.g., a webbing, a fabric, etc.).

Aspects of the technology also include a housing to store the light-altering element. In some aspects of the technology, the light-altering element is housed in an integrated housing element of the softbox. For example, a pocket may be coupled to the inner or outer surface of the body of the softbox, and the light-altering element may be folded and stored in the pocket. In other examples, the light-altering element may be rolled and secured via a band having a snap or other securing mechanism. The band or other securing element may removably secure the light-altering element to an outside surface of an inside surface of the softbox.

In some aspects, the light-altering element may be partially integrated into the body of the softbox such that a portion of the edge of the light-altering element is non-removably coupled to the edge of the distal portion of the body of the softbox. For example, where the body of the softbox includes a housing to secure the light-altering element, an edge of the light-altering element may be non-removably coupled to the distal portion of the body of the softbox proximate to the housing.

In aspects, the partially integrated light-altering element is designed such that in an expanded form, the light-altering element couples (via zippers, magnets, or other coupling means) to the edge (or proximate to the edge) of the distal portion of the body of the softbox. One benefit of having at least a portion of the edge of the light-altering element non-removably coupled to the body of the softbox is that the need for a user to precisely align the edge of the light-altering element with the softbox is mitigated. For example, on single edge of an octagonal diffuser (or other shape) may be sewn to a surface of the softbox. This allows, in some applications, for easy alignment of the remaining sides.

In some aspects of the technology, the softbox additionally/alternatively includes one or more coupling elements disposed within a cuff of the body of the softbox. These coupling elements may couple to another light-altering element. For example, the coupling elements may be magnets/ferromagnetic material that may align with magnets/ferromagnetic material of a light-altering element, such as a flexible and/or collapsible grid, gel, or diffuser.

In examples, the coupling elements (e.g., magnets/ferromagnetic material) of a light-altering element may be located on at least a portion of the edge of a light-altering element. In some aspects of the technology, both the cuff of the body of the softbox and at least a portion of the light-altering element have magnets that are arranged such that the poles of the magnets assist the user in aligning the light-altering element with the softbox to form a robust coupling.

Aspects of the technology include a softbox with a plurality of frame arms each having a distal end and a proximal end, wherein the proximal end of each of the plurality of frame arms is coupled to a light ring having a body and an outer surface, the body defining an opening through which light from a camera lighting element is capable of passing. The softbox body may have a first surface, a second surface, a proximal edge, and a distal edge, wherein the proximal edge is coupled to the outer surface of the light ring, and further wherein at least a portion of the distal ends of the plurality of frame arms are coupled to the softbox body at coupling locations. A light-altering element may have a light-altering body, a first edge portion, and a second edge portion, wherein the first edge portion is non-removably coupled to the softbox body, and further wherein the second edge portion comprises a coupling element. The securing element may be coupled to an inside surface of the softbox body proximate to a distal edge of the softbox body such that the securing element may couple to the coupling element.

In examples, the securing element is a zipper. In further examples, a light-altering element housing is coupled to the first surface of the softbox body. In further examples, the light-altering element housing is a pocket. The light-altering element may be a diffuser. The diffuser may be opaque, transparent, semi-transparent, or translucent. The coupling element may at least one selected from the group consisting of: a plurality of magnets, a zipper, a hook and loop fastener, hook and eye fasteners, snaps, buttons, and toggles. The body may be a fully or semi-reflective fabric.

Aspects of the technology include a softbox system having a softbox having: a plurality of frame arms each have a distal end and a proximal end, wherein the proximal end of each of the plurality of frame arms is coupled to an adapter element having a body and an outer surface, the body defining an opening through which light from a camera lighting element is capable of passing; a webbing having a first side, a second side, a proximal edge, and a cuff proximate a distal edge; wherein the proximal edge is coupled to the outer surface of the adapter element, wherein at least a portion of the distal ends of the plurality of frame arms are coupled to the webbing at coupling locations; one or more coupling elements integrated into the webbing at the cuff of the webbing; a light-altering element having a body and a side-surface, the side-surface removably coupled to coupling elements via attachment elements.

In examples, one or more coupling elements are magnets. In examples, the light-altering element is a grid that is flexible.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

Non-limiting and non-exhaustive embodiments are described with reference to the following figures.

DETAILED DESCRIPTION

Aspects of the present technology relate to a softbox with one or more coupling elements to couple one or more light-altering elements, such as a light diffuser, a grid, a gel, a snoot, etc. In one aspect of the technology, the light-altering element is housed on or in the body of the softbox (for example, along an inner or outer surface of the body (e.g., the fabric of the softbox)). In examples, a pocket or pouch may be sewn or otherwise coupled to a surface of the softbox. In another example, button/straps may be used to secure the light-altering element to the softbox body. An edge of the light-altering element may have a portion non-removably coupled to the edge of the softbox. All or a portion of the remaining edge of the light-altering element may have one or more attachment elements capable of coupling to the edge (or proximate to the edge) of the softbox body. As a specific, non-limiting example, a portion of a diffuser may be sewn to the inside surface of the fabric of the softbox (proximate to the edge of the fabric of the softbox, in some cases), and the remaining edge of the light diffuser may include a zipper capable of being zipped to the remaining edge of the softbox.

Additionally/alternatively, aspects of the technology include a light-altering device with coupling elements disposed within a side of the light-altering-element. The coupling elements may engage with coupling elements of a softbox. For example, a flexible grid may use magnets around a side-edge to couple to an inside portion of the softbox fabric. In examples, a cuff of the softbox fabric receives the magnets of the additional light alternating element, such as a grid.

Figure 1A:
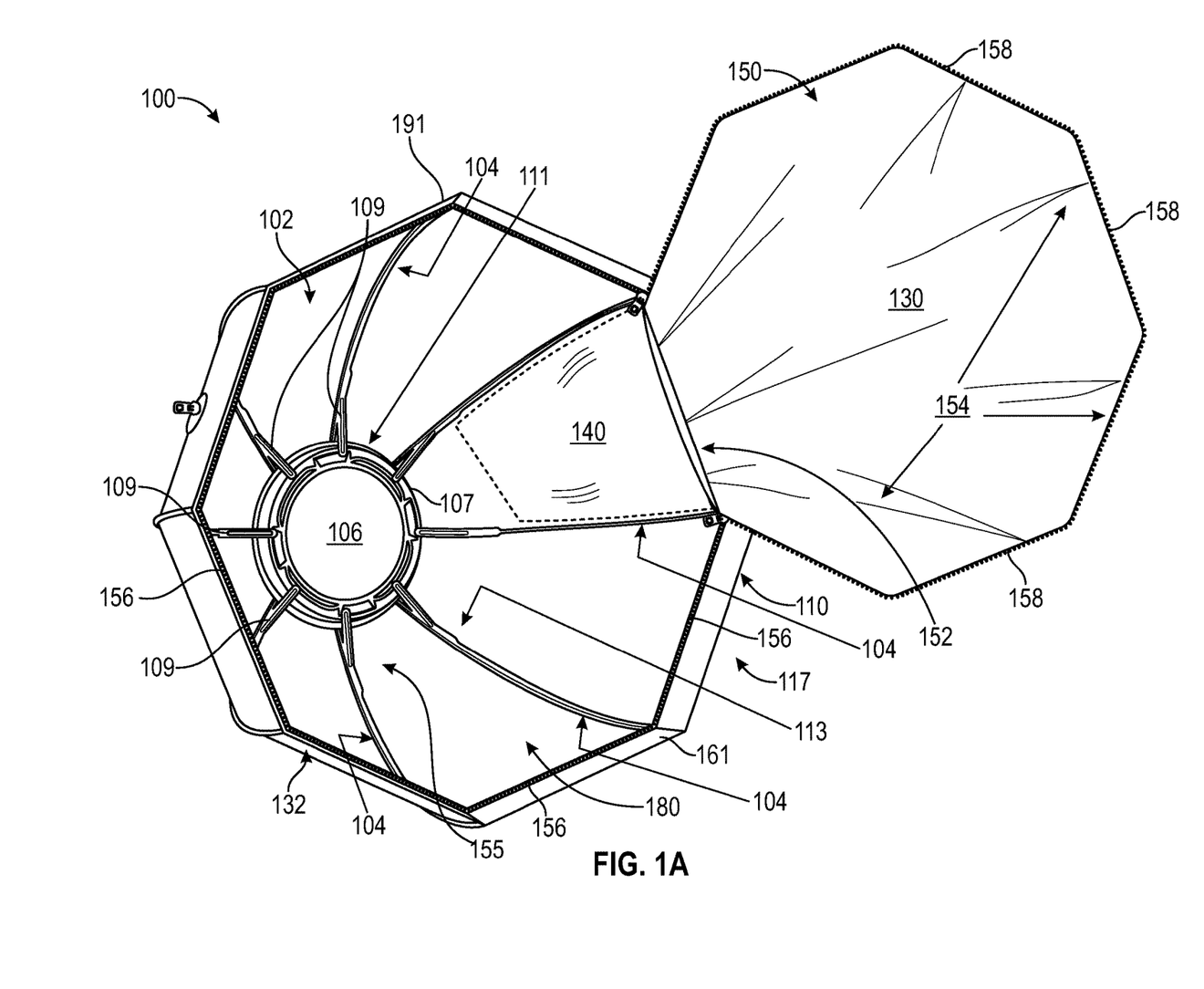
FIG. 1A illustrates a view of a softbox with a partially integrated light-altering element.
Figure 1B:
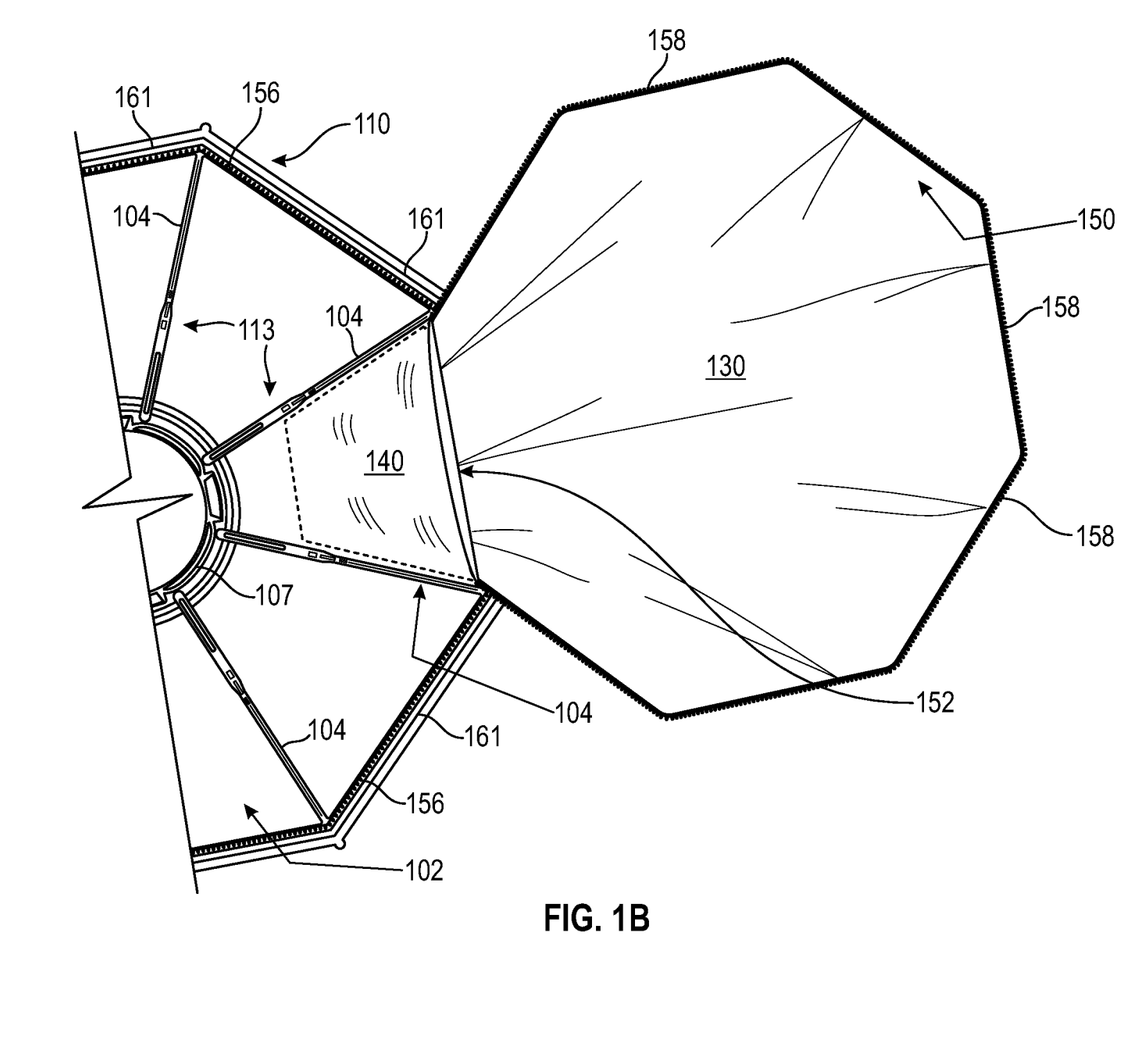
FIG. 1B illustrates a close-up view of an example coupling element of a light-altering device.

Turning to the figures, FIG. 1A illustrates a view of a softbox 100 with a partially integrated light-altering element 130. FIG. 1B illustrates a close-up view of the coupling elements 158 of the softbox 100. As illustrated, a softbox 100 includes a body 102. The body 102 may comprise a cloth, webbing, or other flexible/semi-flexible, semi rigid, rigid, and/or collapsible material. In aspects of the technology, the material of the body 102 has semi-opaque, reflective, and/or fully opaque properties to guide light from a light source through an opening 106 to a target. The body 102 is supported by a frame assembly 113.

As illustrated, the frame assembly 113 includes a support element 107 coupled to frame arms 104. The illustrated support element 107 is a ring having a body defining an opening 106 with an outer annular surface 111. The proximal portion 155 of the body 102 of the softbox is coupled to the outer annular surface 111. While the illustrated frame assembly includes pivot arms 109 to facilitate collapsing the frame assembly 113 (as described with reference to U.S. Pat. No. 11,281,073, the entirety of which is hereby incorporated by reference), it will be appreciated that aspects of the technology disclosed herein may be used with non-collapsible softboxes.

As illustrated, the material (e.g., webbing) of the body 102 couples to the frame arms 104 at coupling locations 191. The coupling locations 191 may be near the distal end 117 of the body 102. Coupling may occur through a variety of mechanisms. For example, an insert or receiving tab may be sewn or otherwise coupled to the body 102 at the coupling locations 191. In aspects, an insert or receiving tab may facilitate the distal end of the frame arm 104 being removably-inserted into the body 102 at the coupling locations 191. Other coupling means are contemplated including rivets, pins, screws, nails, adhesive, and any other means now known or later developed suitable for coupling the body 102 to the distal end of the frame arm 104.

Coupling the body 102 to the frame arms 104 allows the body 102 to be stretched from opening 106 to a distal end of the frame arms 104. Thus, the body 102 may form a variety of shapes, including a frustoconical shape, rectangular prism shape, or, as illustrated, a dome shape. As illustrated, the body 102 has an inside surface 180 (upon which light from the opening may be reflected, in examples). Opposite the inside surface 180 is an outside surface 132. Additionally illustrated is a distal edge 110 of the body 102. An example softbox and frame arm assembly is provided in U.S. Pat. No. 11,281,073, the entirety of which is incorporated by reference.

Additionally, illustrated in FIG. 1 is light-altering-element 130. As illustrated light-altering element 130 is shown as an integrated light-altering element. The integrated light-altering element 130 may be stored coupled to the softbox body 102 through the use of a housing 140. In the example illustrated, the housing 140 is a pocket that houses the light-altering element 130 when the light-altering element 130 is in a collapsed form. The housing may also be a sleeve or pouch. The light-altering element 130 may be a foldable or collapsible light diffuser, gel, grid, or other light altering element.

As illustrated, the light-altering element 130 has an edge portion 152. A first edge portion 152 is, as shown, non-removably coupled proximate to the distal edge 110 of the softbox webbing. This may be accomplished by sewing, gluing, riveting, etc., the first edge portion 152 to the softbox body 102. In aspects, this occurs at or near the distal edge 110 of the body 102. For example, the first edge portion 152 may be glued or stitched to the inside surface 180 along the first edge portion 152.

In aspects of the technology, the other edge portions 154 may have a coupling element 158 adapted to removably couple to light-altering element coupling locations 156 of the softbox body 102. As illustrated, the coupling location is an inner surface disposed proximate to the distal edge 110 of the softbox body 102. In aspects of the technology, the coupling element 158 may be a hook fastener or a ferro-magnetic material, and the light-altering element coupling locations 156 may comprise a loop fastener or a flexible magnet, respectively. As a particular example, a zipper may be integrated at the other edge portions 154 as a coupling element 158, and that zipper may align with and removably attach to a receiving zipper at the light-altering element coupling locations 156. In other examples coupling the coupling element 158 to the light-altering element coupling locations 156 may occur using other means. For example, the coupling may occur by using one or more coupling means such as hook and loop fasteners, buttons, magnets, ferromagnetic material, snaps, or any other attachment means now known or later developed capable of removably coupling the other edge portions 154 to the distal edge 110 of the softbox body 102.

As illustrated, the light-altering element coupling location 156 is located proximate to a distal edge 110 of the body 102. Between a distal edge 110 of the body 102 and the light-altering element coupling location 156 is a cuff 161. The cuff 161 is an area of the body 102 that may house one or more attachment elements, such as those attachment elements described with reference to FIGS. 4-6. As illustrated, the cuff 161 is disposed between the coupling locations 156 and the edge 110. In some aspects, the cuff is disposed proximate to the edge 110.

As illustrated the light-altering element 130 is in the shape of an octagon, and the first edge portion 152 is non-removably coupled near (for example, sewn on) the distal edge 110 of the body 102. As illustrated, first edge portion 152 is non-removably coupled to the body proximate to the cuff 161 (as illustrated, on the proximal edge of the cuff), but not on the cuff 161, to allow for an additional light-altering element, such as the additional light altering elements illustrated in FIGS. 4-6, to be coupled to the softbox.

The illustrated light-altering element 130 may be folded or otherwise collapsed into a housing 140 (such as the pocket shown). The housing element 140 may be one of a pocket, a strapping mechanism, a catch, a magnetic catch, or any other housing element capable of securing the light-altering element 130 when the light-altering element 130 is in a collapsed, rolled, and/or folded form. As illustrated the housing element 140 has been integrated as a pocket into the inside surface 180 of the body 102, but it will be appreciated that other housing element locations are contemplated. For example, the housing element 140 may be on the outside surface 132 of the body 102.

Figure 2A:
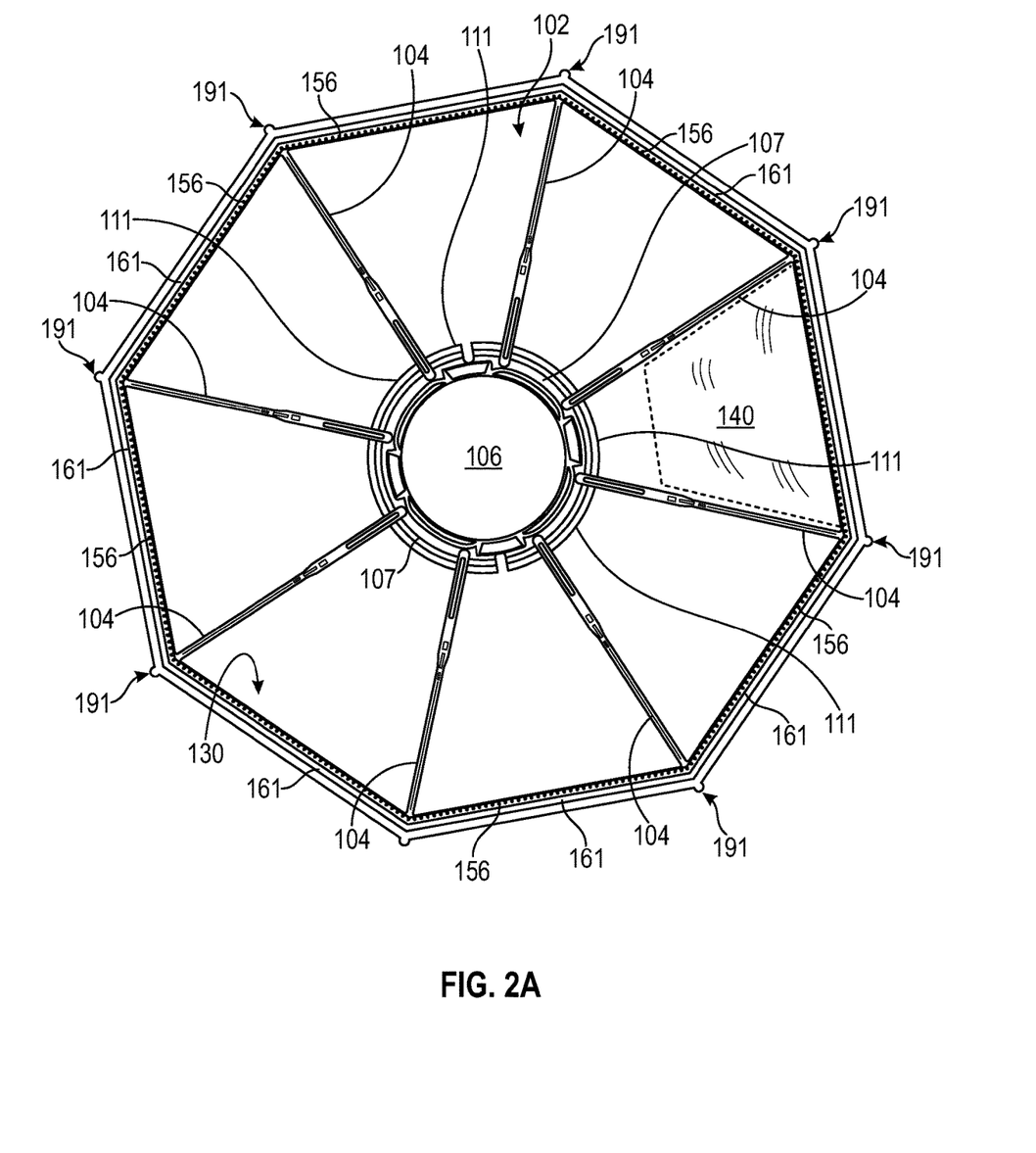
FIG. 2A illustrates a view of a softbox with a light-altering element secured in a housing of a softbox.
Figure 2B:
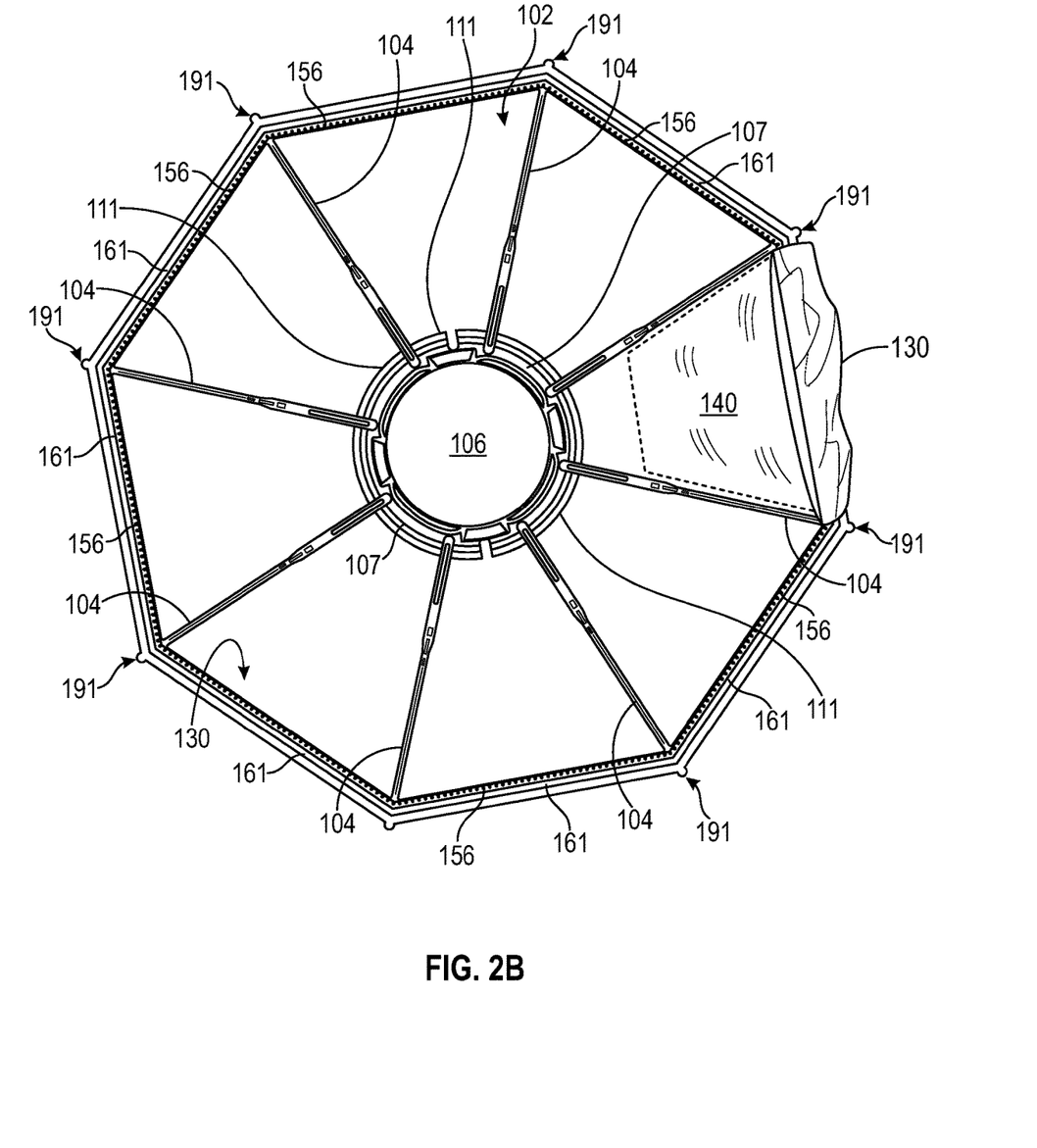
FIG. 2B illustrates a view of a softbox with a light-altering element partially out of a housing of a softbox.
Figure 2C:
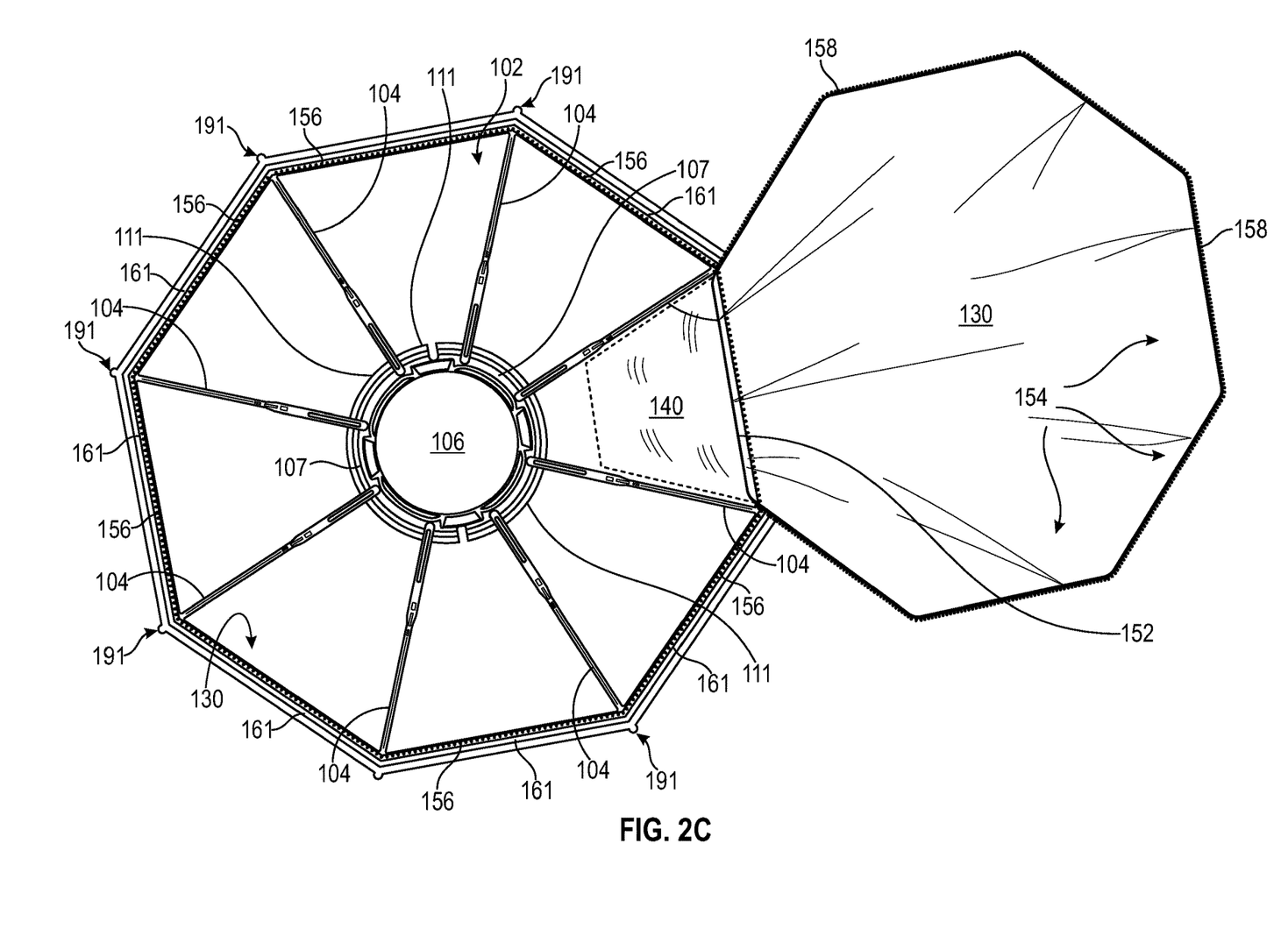
FIG. 2C illustrates a view of a softbox having a light-altering element in an expanded position.
Figure 2D:
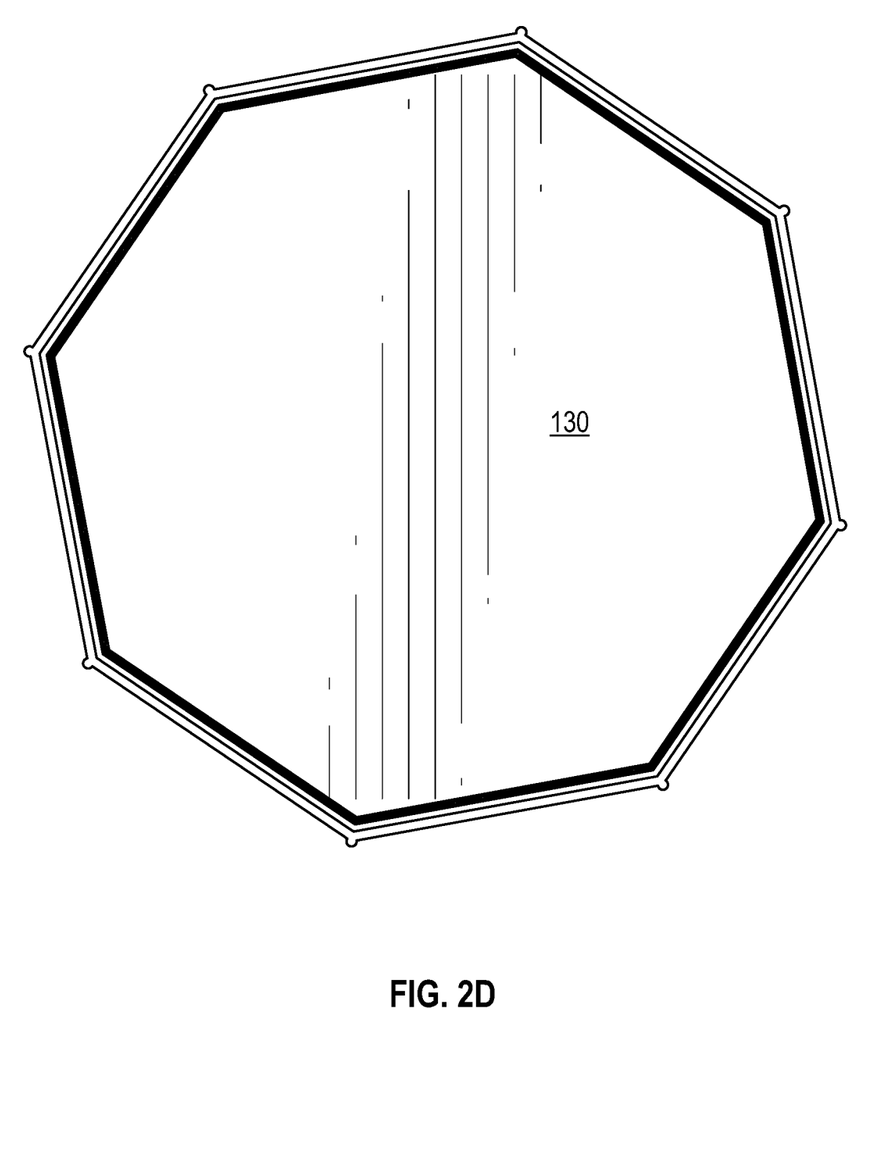
FIG. 2D illustrates a view of a softbox having a light-altering element coupled to the softbox.

FIGS. 2A through 2D illustrate the light-altering element 130 in various stages of unfolding. It will be appreciated the elements in FIGS. 2A-2D that are liked numbered as those elements of FIGS. 1A and 1B will have the same or similar properties as those elements of FIGS. 1A and 1B. FIG. 2A illustrates a view of a softbox with a light-altering element secured in a housing 140 of a softbox body 102. FIG. 2B illustrates a view of a softbox body 102 with a light-altering element 130 partially out of a housing 140 of a softbox. FIG. 2C illustrates a view of a softbox body having a light-altering element 130 in an expanded position. FIG. 2D illustrates a view of a softbox body having a light-altering element 130 coupled to the body 102 of the softbox.

Figure 3:
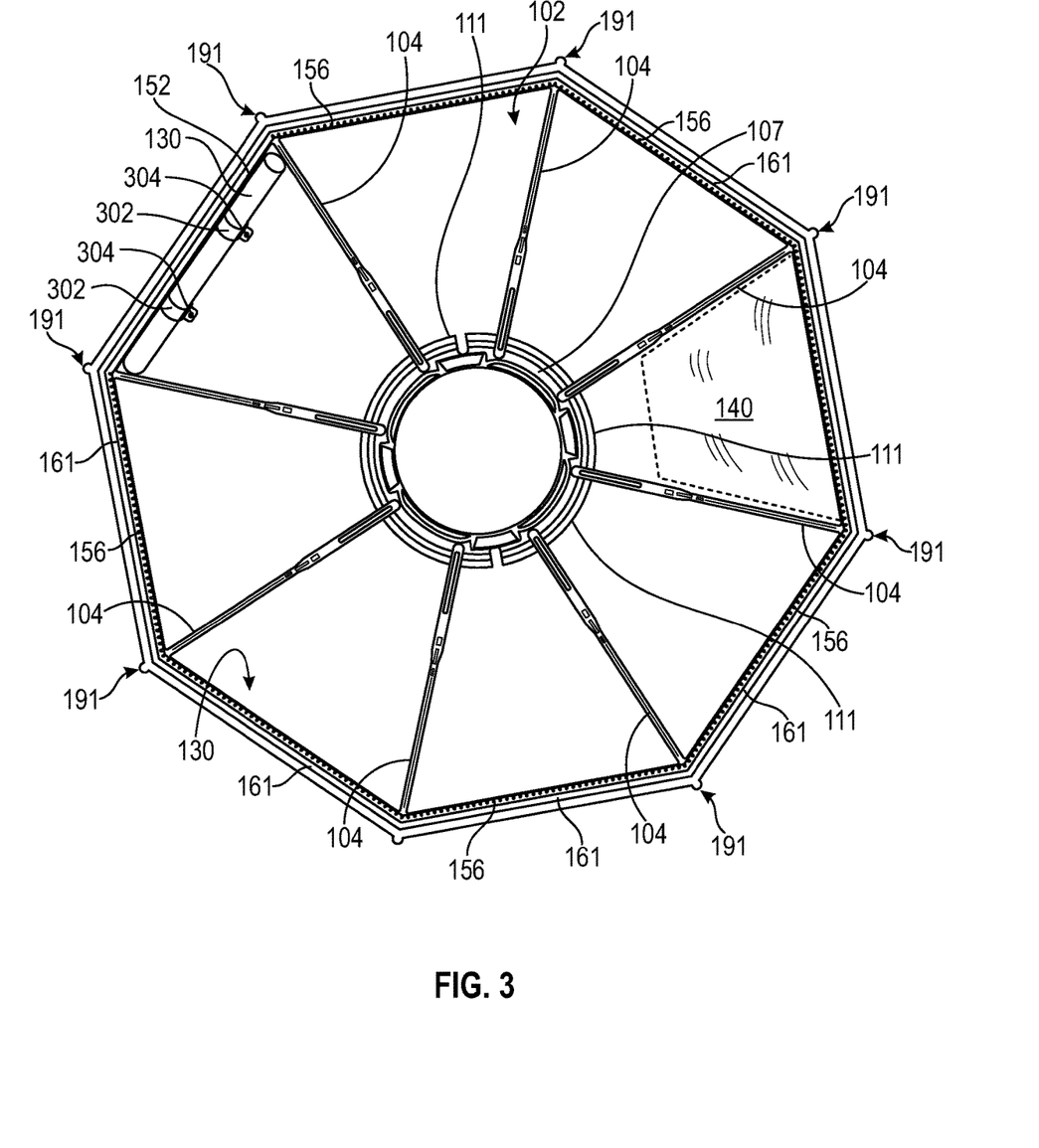
FIG. 3 illustrates an alternative securing system for a light-altering element of a softbox.

FIG. 3 illustrates an alternative securing system for a light-altering element 130. It will be appreciated that same numbered elements of FIG. 3 will have the same or similar properties as those properties described above. FIG. 3 illustrates a light-altering element 130 being housed using straps 302 and securing elements 304. As illustrated, securing elements 304 are snaps, but the securing elements may be buttons, hook and loop fasteners, clasps, or other means of securing a light-altering element. The light-altering element is illustrated as being rolled, but it may be folded or otherwise compacted to be secured using the straps 302 and the securing elements 304. It will be appreciated that the light-altering element 130 may be secured using the straps 302 and securing elements 304 while additionally having a coupling element 158 (not shown) adapted to removably couple to light-altering element coupling locations 156 of the softbox body 102. An edge 152 of the light-altering element 130 may be non-removably secured the body 102.

Figure 4:
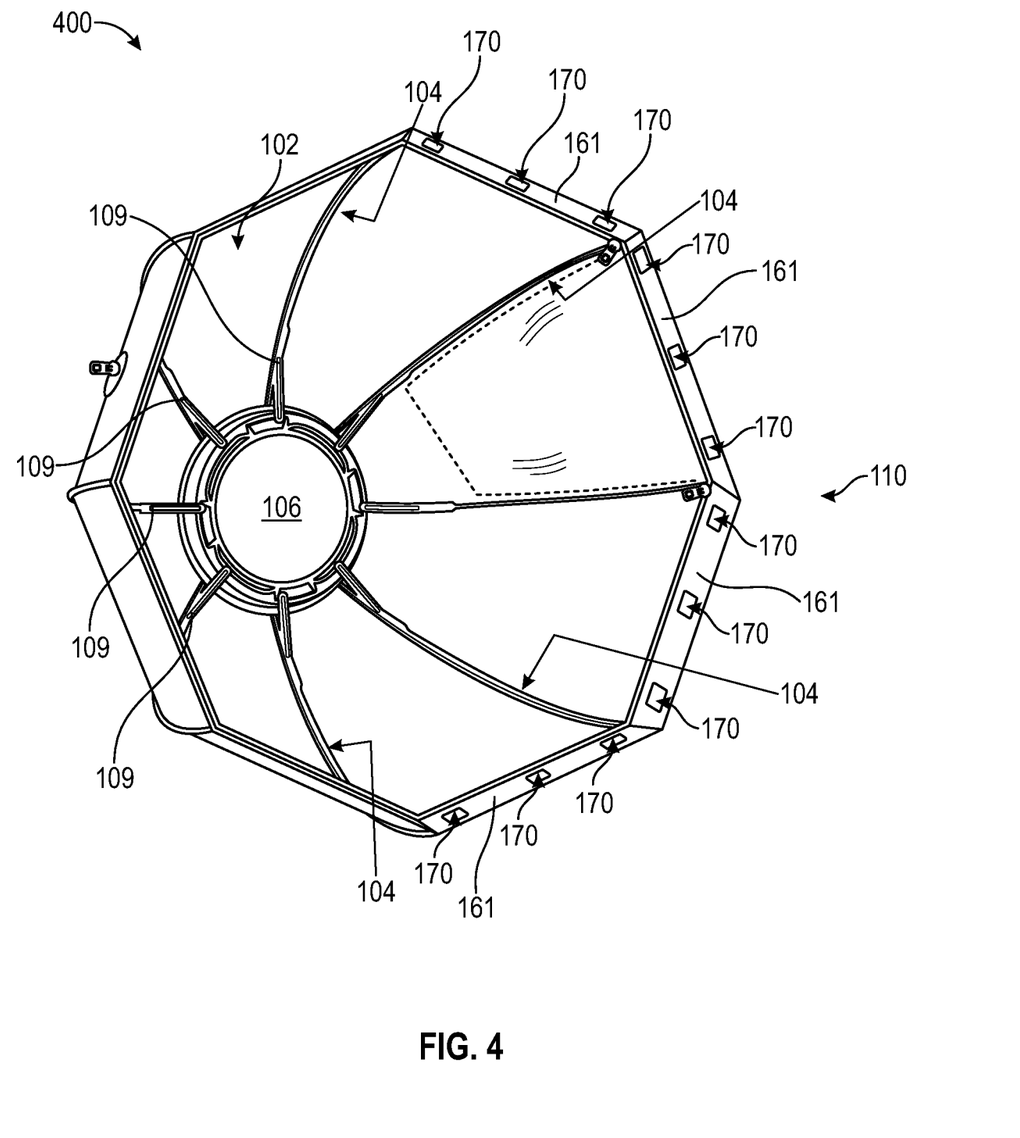
FIG. 4 illustrates a softbox body having additional coupling elements.

FIG. 4 illustrates a softbox body having an additional coupling element 170. It will be appreciated that elements of FIG. 4 like numbered as those above will have the same or similar properties as those described above. As illustrated, the cuff 161 of the body 102 includes a plurality of additional coupling elements 170. Coupling elements 170 may be ferromagnetic material comprised of magnets or a steel composite, for example. These coupling elements 170 may be used to couple a light-altering element to the distal edge 110 of the softbox 400. An example light-altering element is illustrated with reference to FIGS. 5A and 5B. It will be appreciated that a softbox may have both a partially integrated light alternating element such as those described with reference to FIGS. 1-3 as well as an additional light alternating element, such as the light altering element described with reference to FIGS. 5A and 5B.

Figure 5A:
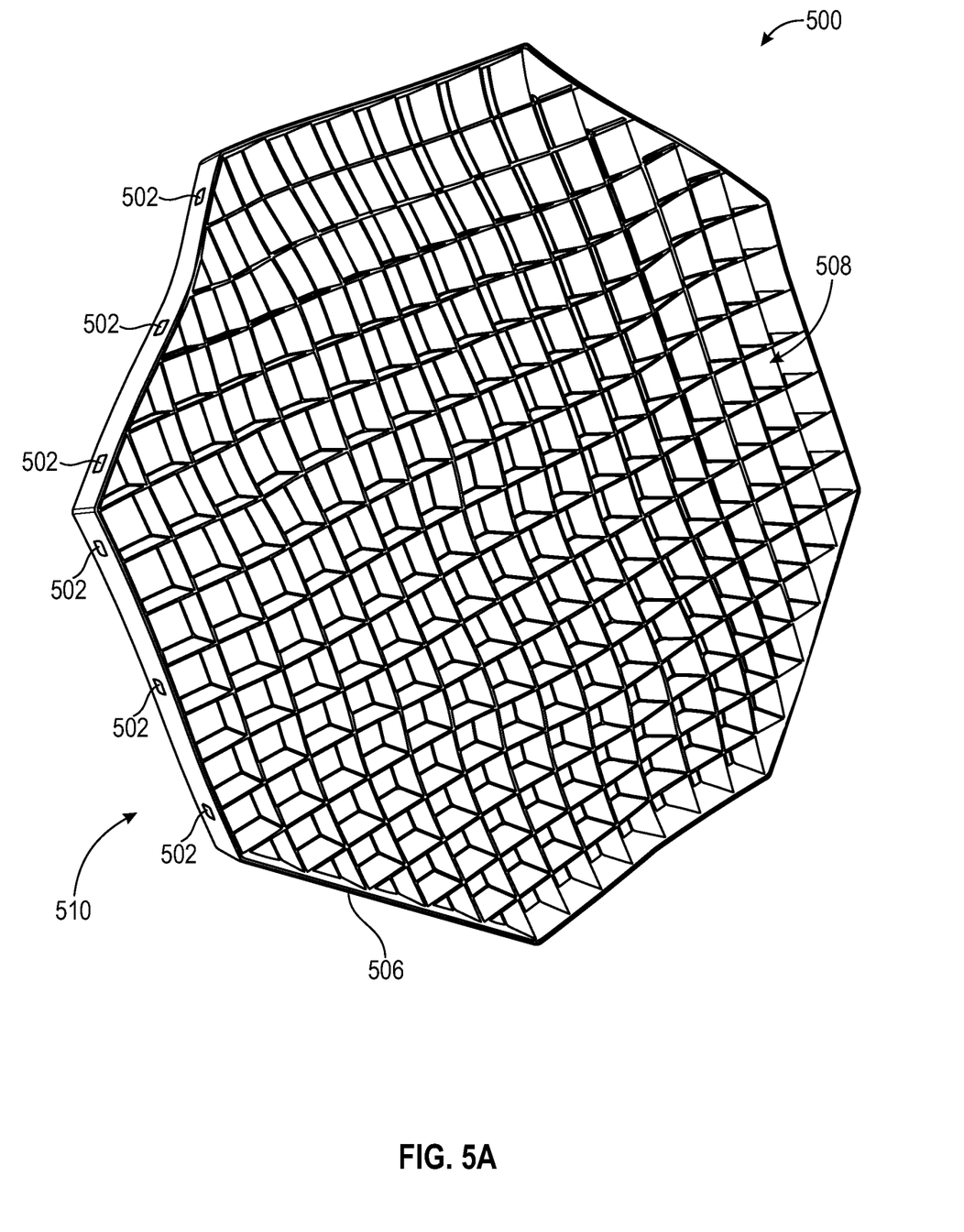
FIGS. 5A and 5B illustrate various views of an example light-altering element integrated with coupling elements.
Figure 5B:
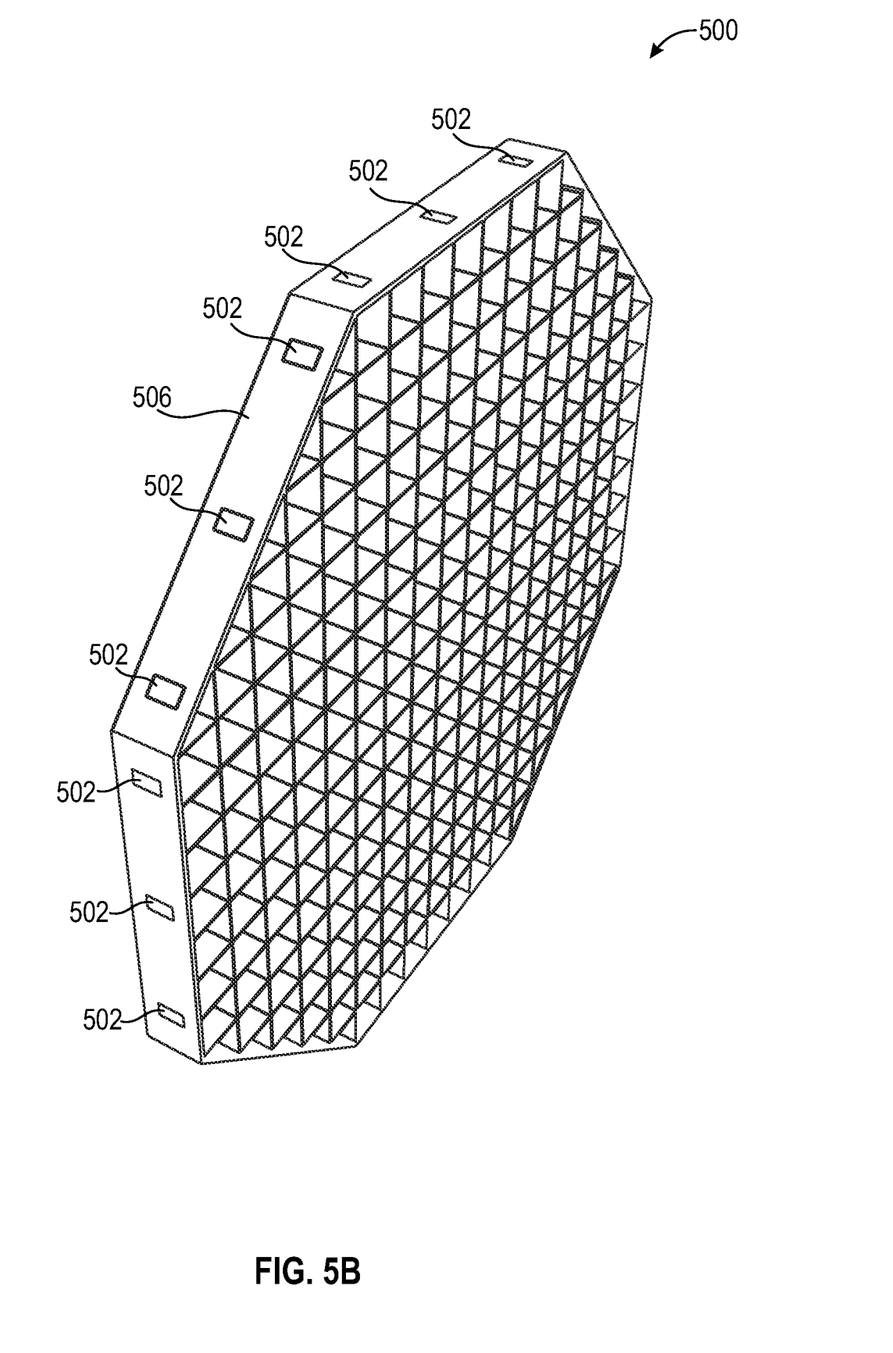

FIGS. 5A and 5B illustrate an example light-altering element 500. As illustrated the light-altering element 500 is a collapsible grid having attachment elements 502 integrated at the side-edge 506 of the body 504. The body 504 also has a front face 508 and a back face 510. In aspects of the technology, the light-altering element 500 may be a gel, a diffuser, a snoot, or other object. In examples, the light-altering element 500 is bendable, flexible, and/or semi foldable. In others, the light-altering element 500 is rigid. The attachment elements 502 may be magnets or a ferromagnetic material designed to align with the cuff of a body of a softbox, such as the cuff 161 of the body 102 illustrated with reference to FIG. 1. The attachment elements 502 may align with the attachment elements integrated into a softbox, such as the additional elements 170 described with reference to FIG. 4. In some aspects of the technology the attachment elements 502 and the additional coupling elements 170 are oriented in such a way so as to assist in aligning and attachment of the light-altering element 500 to a softbox, such as the softbox illustrated with reference to FIG. 4. For example, both attachment elements 502 and additional coupling elements 170 may be magnets, and the orientation of the poles of the magnets within each of the attachment elements 502 and the additional elements 170 may be such that the coupling of the light-altering element 500 to a softbox is assisted when the magnets are aligned with each other. In this way, the attachment elements 502 may facilitate the light-altering element 500 being aligned appropriately before being coupled to a softbox.

Figure 6A:
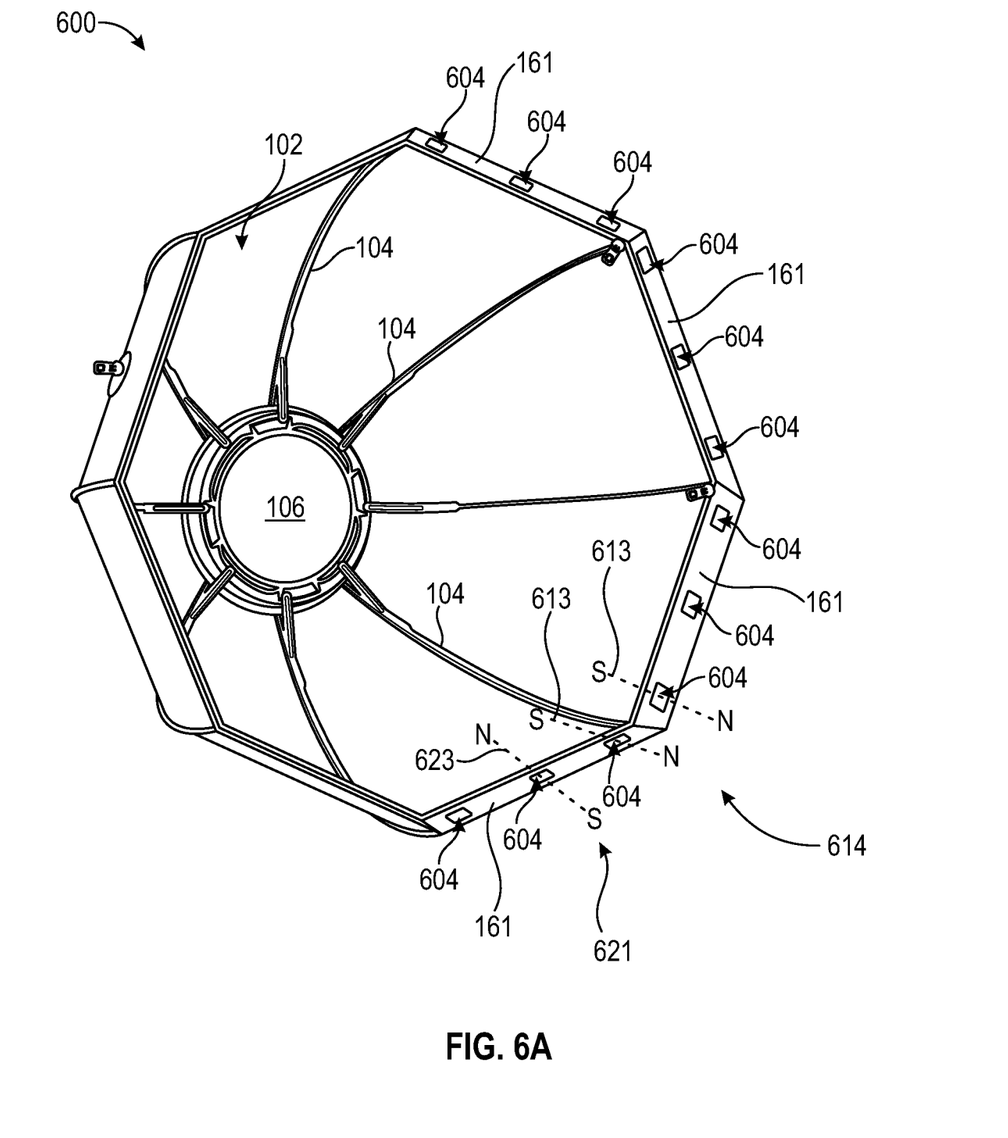
FIGS. 6A and 6B illustrate an example of a light-altering element with magnets and a softbox.
Figure 6B:
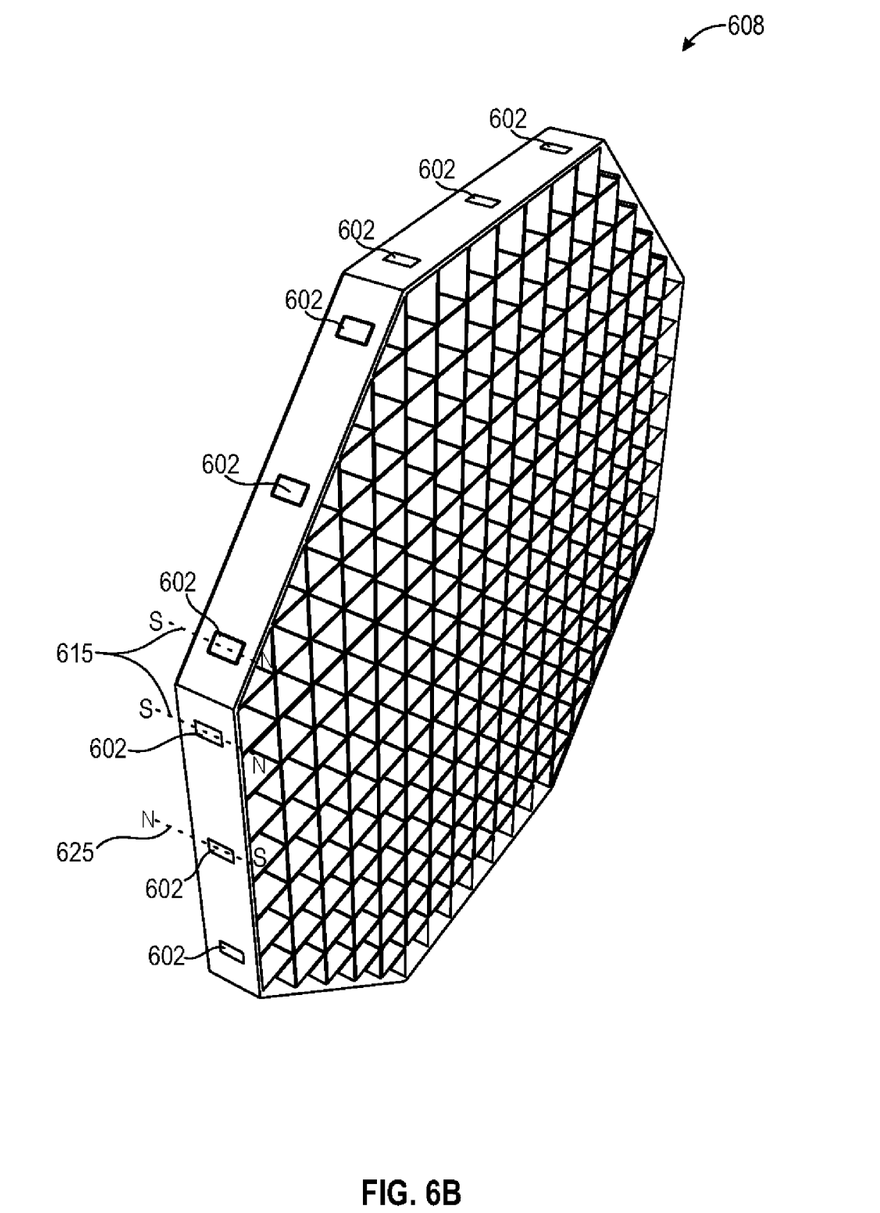

With reference to FIGS. 6A and 6B, FIG. 6A illustrates an example softbox 600 having integrated magnets 604 located on the cuff 161 of the softbox 600. It will be appreciated that elements are similarly numbered in FIG. 6 as FIGS. 1-5 will have the same or properties as those described above. Additionally illustrated in FIG. 6B is a light-altering element 608 (as illustrated, a flexible grid) having magnet attachment elements 602.

In examples, the softbox has a first receiving area 614 with a first plurality of magnets having poles 613. In aspects of the technology, each of the poles 613 are aligned with the poles 615 of other magnets of a first coupling area of the light-altering element 608. Additionally, the softbox may have a second receiving area 621 with one or more magnets having oppositely aligned poles 623 to poles 613. Indeed, the poles 623 may correspond to poles 625 of one or more magnets of a light altering element 608. This may bias a first receiving area of the softbox 600 to couple to a first coupling area of the light-altering element 608 and a second receiving area to couple to a second coupling area of the light altering element 608.

The description and illustration of one or more embodiments, examples, or aspects of the technology provided in this application are not intended to limit or restrict the scope of the invention as claimed in any way. The embodiments, examples, and details provided in this application are considered sufficient to convey possession and enable others to make and use the best mode of claimed innovative technologies. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A softbox comprising:
   a plurality of frame arms each having a distal end and a proximal end, wherein the proximal end of each of the plurality of frame arms is coupled to a light ring having a body and an outer surface, the body defining an opening through which light from a camera lighting element is capable of passing;
   a softbox body having an inside surface, an outside surface, a proximal edge, and a distal edge, wherein the softbox body is stretched over the plurality of frame arms, and further wherein at least a portion of the distal ends of the plurality of frame arms are coupled to the softbox body at coupling locations;
   a light-altering element having a light-altering body, a first edge portion, and a second edge portion, wherein the first edge portion is non-removably coupled to the softbox body, and further wherein the second edge portion comprises a coupling element;
   a securing element coupled to the inside surface of the softbox body proximate to the distal edge of the softbox body such that the securing element may couple to the coupling element.

2. The softbox of claim 1, wherein the securing element is a zipper.

3. The softbox of claim 1, further comprising, a light-altering element housing coupled to the inside surface of the softbox body.

4. The softbox of claim 3, wherein the light-altering element housing is a pocket.

5. The softbox of claim 1, wherein the light-altering element is a diffuser.

6. The softbox of claim 5, wherein the diffuser is opaque, transparent, semi-transparent, or translucent.

7. The softbox of claim 1, wherein the coupling element is at least one selected from the group consisting of: a plurality of magnets, a zipper, a hook and loop fastener, hook and eye fasteners, snaps, buttons, and toggles.

8. The softbox of claim 1, wherein the softbox body is a fully or semi-reflective fabric.

9. A softbox system comprising:
   a softbox having:
      a plurality of frame arms each have a distal end and a proximal end, wherein the proximal end of each of the plurality of frame arms is coupled to a light ring having a body and an outer surface, the body defining an opening;
      a webbing disposed across the plurality of frame arms to form an inside surface, an outside surface, a proximal edge, and a cuff proximate to a distal edge, wherein at least a portion of the distal ends of the plurality of frame arms are coupled to the webbing at coupling locations;
      one or more coupling elements integrated into the webbing at the cuff of the webbing;
   a light-altering element having a body and a side-surface, the side-surface removably coupled to coupling elements via attachment elements.

10. The softbox system of claim 9, wherein the one or more coupling elements are magnets.

11. The softbox system of claim 9, wherein the light-altering element is a grid.

12. The softbox system of claim 11, wherein the grid is flexible.

\* \* \* \* \*